(12) United States Patent
Cho et al.

(10) Patent No.: US 10,704,013 B2
(45) Date of Patent: Jul. 7, 2020

(54) SHEET FOR WASHING

(71) Applicant: LG Household & Health Care Ltd., Seoul (KR)

(72) Inventors: Min-Seok Cho, Daejeon (KR); Mun-Seong Jo, Daejeon (KR); Kyung-On Cha, Daejeon (KR)

(73) Assignee: LG Household & Health Care Ltd. (KR)

( * ) Notice: Subject to any disclaimer, the term of this patent is extended or adjusted under 35 U.S.C. 154(b) by 2 days.

(21) Appl. No.: 16/064,309

(22) PCT Filed: Dec. 22, 2016

(86) PCT No.: PCT/KR2016/015103
§ 371 (c)(1),
(2) Date: Jun. 20, 2018

(87) PCT Pub. No.: WO2017/111498
PCT Pub. Date: Jun. 29, 2017

(65) Prior Publication Data
US 2019/0010431 A1    Jan. 10, 2019

(30) Foreign Application Priority Data

Dec. 22, 2015 (KR) .......... 10-2015-0184004
Jul. 29, 2016 (KR) .......... 10-2016-0097074

(51) Int. Cl.
*C11D 17/04* (2006.01)
*C11D 3/00* (2006.01)
(Continued)

(52) U.S. Cl.
CPC .......... *C11D 17/042* (2013.01); *C11D 3/001* (2013.01); *C11D 3/3753* (2013.01); *C11D 3/50* (2013.01); *C11D 17/045* (2013.01)

(58) Field of Classification Search
None
See application file for complete search history.

(56) References Cited

U.S. PATENT DOCUMENTS 4,416,791 A * 11/1983 Haq .............. C11D 17/042
                                                     510/296
4,605,509 A    8/1986 Corkill et al.
(Continued)

FOREIGN PATENT DOCUMENTS

EP    0957158 A1    11/1999
JP    S58135794 A    8/1983
(Continued)

OTHER PUBLICATIONS

English text machine translation of Shim et al. (KR 20120021449), accessed online from Google Patents; a PDF copy, pp. 1-10, is attached. (Year: 2012).*

(Continued)

*Primary Examiner* — Katie L. Hammer
(74) *Attorney, Agent, or Firm* — Lerner, David, Littenberg, Krumholz & Mentlik, LLP (57) ABSTRACT

The present invention provides a washing product comprising two or more sheets, which comprise a water-soluble polymer and have different dissolution rates in water, wherein each sheet contains i) washing detergent components, ii) washing softening components, iii) an aromatic agent, or iv) two or more thereof. Since two or more sheets have the different dissolution rates, in the present invention, the discharge time of the washing components contained in the sheets can be controlled, thereby having an excellent washing effect.

11 Claims, 3 Drawing Sheets

(51) Int. Cl.
*C11D 3/37* (2006.01)
*C11D 3/50* (2006.01)

(56) References Cited

U.S. PATENT DOCUMENTS

| | | | | |
|---|---|---|---|---|
| 4,654,395 | A * | 3/1987 | Schulz | C11D 17/042 524/560 |
| 4,797,221 | A * | 1/1989 | Gueldenzopf | C11D 3/395 252/186.2 |
| 5,798,152 | A * | 8/1998 | Stevens | B32B 27/08 264/514 |
| 6,465,407 | B2 * | 10/2002 | Hayashi | C11D 1/62 510/295 |
| 6,699,826 | B1 * | 3/2004 | Saijo | C11D 1/62 510/296 |
| 6,818,606 | B1 * | 11/2004 | Hanada | C11D 11/02 510/296 |
| 7,049,279 | B1 * | 5/2006 | Weuthen | C11D 1/32 510/276 |
| 2002/0115583 | A1 | 8/2002 | Lant et al. | |
| 2003/0104969 | A1 * | 6/2003 | Caswell | A47F 1/08 510/513 |
| 2003/0114332 | A1 * | 6/2003 | Ramcharan | C11D 17/0004 510/296 |
| 2008/0014393 | A1 | 1/2008 | Denome et al. | |

FOREIGN PATENT DOCUMENTS

| | | |
|---|---|---|
| KR | 10-1999-0030414 | 4/1999 |
| KR | 20030097210 A | 12/2003 |
| KR | 20120021449 A | 3/2012 |
| KR | 20120130688 A | 12/2012 |
| KR | 20140102458 A | 8/2014 |
| WO | 0226928 A1 | 4/2002 |
| WO | 2012-157851 A2 | 11/2012 |

OTHER PUBLICATIONS

International Search Report From PCT/KR2016/015103 dated Mar. 31, 2017.
Extended European Search Report for Application No. EP16879365.1, dated Jul. 22, 2019, pp. 1-3.

* cited by examiner

SHEET FOR WASHING

CROSS-REFERENCE TO RELATED APPLICATIONS

This application is a national phase entry under 35 U.S.C. § 371 of International Application No. PCT/KR2016/015103, filed Dec. 22, 2016, which claims priority to Korean Patent Application No. 10-2015-0184004, filed Dec. 22, 2015, and Korean Patent Application No. 10-2016-0097074, filed Jul. 29, 2016, the disclosures of which are incorporated herein by reference.

TECHNICAL FIELD

The present disclosure relates to a sheet for washing and a manufacturing method thereof. More particularly, the present disclosure relates to a sheet for washing with improved effect of the components included in the sheet for washing and a manufacturing method thereof.

BACKGROUND ART

Currently, polymer films are widely used not only in the industrial field including fine chemistry and electronic materials but also household products including personal care products such as drugs and cosmetics and daily supplies. Examples of the polymer film used in drugs or cosmetics include a fomentation sheet or an adhesive sheet that attaches to skin in which medication is stacked on a substrate together with a water-insoluble polymer film, and in this instance, the polymer film forms a matrix, exhibiting sustained release properties. Furthermore, a polymer film in daily supplies is widely used as a packaging that individually packages a particular material and active components to provide convenience of use. For example, a polymer film is used as a material for individually packaging a detergent composition such as a powder detergent and a liquid detergent. Korean Patent Publication No. 10-1999-0030414 uses a polyvinylalcohol film, a gelatin film, a starch film and a cellulose film having high water solubility as a standard usage packaging bag to prevent the scattering phenomenon of a powder detergent and induce a suitable amount to use and consequently protect the water quality. U.S. Pat. No. 4,605,509, Japanese Patent Publication No. S58-135794, and Korean Patent Publication No. 10-2004-0676668 disclose packaging a liquid detergent and a fabric softener with a water-soluble film.

However, in the case of individual packaging using water-soluble polymer films, when individually packaged products are stored or transported, seal may be broken and the contents may leak, and active components ooze from the film surface, causing the storage stability of the products to greatly reduce. Furthermore, in the case of the water-soluble film used as the packaging material, it has design that ensures stability against moisture in the air and durability for the contents, but for the above reason, it takes a considerable amount of time to dissolve at low temperature, and because it does not completely dissolve, film residues remain.

Korean Patent Publication No. 10-2012-0021449 provides a sheet for washing manufactured by solidifying a water-soluble polymer film-forming composition in which a detergent component for washing and a softening component for washing are distributed. However, due to the formation of a complex of the detergent component for washing and the softening component for washing in the sheet, each component does not effectively exert their performance.

DISCLOSURE

Technical Problem

The present disclosure is aimed to develop a new laundry product with improved cleaning effect.

The present disclosure is aimed to provide a laundry product for preventing the formation of a complex of a detergent component for washing and a softening component for washing when used simultaneously.

The present disclosure is aimed to solve the problem that a detergent component for washing and a softening component for washing each cannot effectively exert their performance due to the formation of a complex by reaction between them.

Technical Solution

To achieve the object, the present disclosure provides a laundry product including two or more sheets made of water-soluble polymer with different dissolution rates in water, each sheet including i) a detergent component for washing, ii) a softening component for washing, iii) perfume (including a fragrance booster) or iv) two or more of these.

Definition of Terms

The term "film" as used herein may be understood as referring to a thin flexible membrane or layer. There is no particular limitation on thickness. The film is not limited to a particular type.

The word or phrase "sheet for washing", "sheet" or "laundry sheet" as used herein may be understood as including, in the film, i) a detergent component for washing, ii) a softening component for washing, iii) perfume, or iv) two or more of these. The "sheet for washing", "sheet" or "laundry sheet" refers to a sheet provided when rinsing a fabric (including a soiled fabric) with water for cleaning of the fabric, softening of the fabric, and fragrance continuance in the fabric. There is no limitation on sheet thickness. The sheet may be flexible or rigid. The sheet may be similar to a thin paper, and may have an irregularly textured surface.

The sheet for washing may be manufactured from a solution prepared by mixing water-soluble polymer for forming a film with a detergent component for washing, but is not limited to a particular manufacturing method. Any type of film including a detergent component for washing may fall within the range. The thickness may be equal to or larger or smaller than the film. The film for washing is not limited to a particular type.

The "component for washing" as used herein is used to include a detergent component for washing, a softening component for washing, perfume, and a fragrance booster.

The present disclosure provides a laundry product for use in washing, including two or more sheets for washing. The laundry product is provided to use two or more sheets for washing together for one load of laundry.

Hereinafter, the present disclosure will be described in more detail.

A laundry product of the present disclosure includes two or more sheets for washing made of water-soluble polymer, wherein components for washing included in each sheet for washing are allowed to exert effects in a proper time due to a dissolution rate difference between the two or more sheets for washing.

Preferably, the present disclosure is intended to solve the problem that the detergent component for washing and the softening component for washing each cannot effectively exert their performance due to the formation of a complex by reaction between them when used simultaneously. The sheet for washing including the softening component for washing dissolves in water more slowly than water-soluble polymer of the sheet for washing including the detergent component for washing, and thus dissolves more slowly than the sheet including the detergent component for washing during washing of laundry, thereby preventing the softening component for washing and the detergent component for washing from forming a complex.

In a preferred embodiment of the present disclosure, the laundry product including the sheets for washing of the present disclosure includes a first sheet made of water-soluble polymer including a detergent component for washing; and a second sheet made of water-soluble polymer including a softening component for washing, wherein the components for washing are allowed to exert effects in a proper time due to a dissolution rate difference between the first sheet and the second sheet.

In an embodiment of the present disclosure, the second sheet including the softening component for washing is made of water-soluble polymer that dissolves in water more slowly than the water-soluble polymer of the first sheet, and thus dissolves more slowly than the first sheet including the detergent component for washing during washing of laundry. The laundry product can prevent the softening component for washing included in the second sheet from forming a complex with the detergent component for washing.

The "dissolution rate" as used herein refers to the time (sec) required to completely dissolve 0.5 g of a sheet made of water-soluble polymer in 300 ml of water as a solvent.

In the present disclosure, the two or more sheets for washing in separate or assembled form may be included in the laundry product.

The term "separate" as used herein represents that the two or more sheets in one laundry product are provided as separate sheets for washing. In the case of washing using the laundry product of the present disclosure including separate sheets for washing, the product may be used i) by introducing the sheet including the detergent component for washing first, and after a lapse of a predetermined period of time, introducing the sheet including the softening component for washing, or ii) by simultaneously introducing the two sheets. Furthermore, many sheets for washing including a desired component for washing may be introduced. For example, two or more sheets including the detergent component for washing may be introduced, followed by introduction of one sheet including the softening component for washing. In the present disclosure, because the sheet including the softening component for washing dissolves in water more slowly than water-soluble polymer of the sheet including the detergent component for washing, even though the two types of sheets are simultaneously introduced using the ii) process, it is possible to prevent the formation of a complex of the detergent component for washing and the softening component for washing.

The term "assembled" as used herein represents that the two or more sheets for washing are adhered together, not detached from each other, and provided in the form of a laundry product, and may be understood as including the terms "connected", "attached", and "adhered".

The assembled form may be provided, for example, by stacking the two or more sheets for washing vertically; or connecting the two or more sheets for washing horizontally. The two or more sheets for washing may be connected horizontally such that they have different regions on a plane.

The two or more sheets for washing may be stacked such that they are stacked with the same size and the total area of the sheets for washing is the same as the stacked layer, and each sheet may overlap in part.

Furthermore, for the two or more sheets included in the laundry product according to the present disclosure to have different dissolution rates in water, the two or more sheets may be manufactured by i) manufacturing each sheet using water-soluble polymer having different degrees of saponification or average polymerization degrees, ii) manufacturing one or more sheets by a bubbling process, iii) manufacturing one or more sheets by a process including punching, or iv) at least one of i) to iii).

That is, each of the two or more sheets included in the laundry product according to the present disclosure are not limited to a particular manufacturing method if each sheet has different dissolution rates.

The water-soluble polymer for manufacturing the sheets for washing included in the laundry product according to the present disclosure may be at least one selected from natural, semi-synthetic and synthetic polymer, and the water-soluble polymer for manufacturing the sheets for washing may be identical or different. For example, if the sheet including the softening component for washing dissolves in water more slowly than the sheet including the detergent component for washing, the water-soluble polymer used in each sheet may be identical or different.

The natural polymer includes gelatin, pectin, dextran, hyaluronic acid or its salt, collagen, agar, gums such as gum arabic, xanthan gum, gum acacia, gum karaya, guar gum, carrageenan acid, alginic acid, and sodium alginate.

The semi-synthetic polymer includes methyl cellulose, ethyl cellulose, hydroxy ethyl cellulose, sodium carboxy methyl cellulose, soluble starch, dextrin, carboxy methyl starch, and dialdehyde starch.

The synthetic polymer may be selected from widely known general purpose synthetic polymer such as polyvinyl alcohol, polyvinyl pyrrolidone, polyvinyl methacrylate, poly acrylic acid and its salt, polyethylene oxide, carboxy group containing acryl resin, carboxy group containing polyester resin, water-soluble polyamide, water-soluble polyurethane, maltodextrin and polydextrose, and may be selected from water-soluble synthetic polymer produced using radical polymerizable monomer. The polymer synthesized from radical polymerizable monomer includes homopolymer of ionic monomer and non-ionic monomer, and in some cases, their copolymer may be used.

Preferred examples of the film-forming water-soluble polymer include polyvinyl alcohol (PVA).

Preferably, polyvinylalcohol has the degree of saponification of 65 to 95% and an average polymerization degree of 100 to 3000 to ensure solubility. When the degree of saponification is less than 65% or exceeds 95%, solubility is low, leading to insolubility in water. Furthermore, when the average polymerization degree is less than 100, the molecular weight is too low, it is not easy to form a film, and properties of the film including tensile strength are not good. When the average polymerization degree exceeds 3000, the molecular weight is too high and solubility in water is not good after film formation.

Each sheet included in the laundry product according to the present disclosure may be made of polyvinylalcohol, and the polyvinylalcohol may have the degree of saponification of 65 to 95% and the degree of polymerization of 100 to 3000.

The dissolution rate difference between the first sheet and the second sheet included in the laundry product according to the present disclosure may be 30 seconds to 20 minutes, preferably 3 minutes to 15 minutes, and more preferably 5 minutes to 10 minutes. This may be appropriately adjusted in consideration of the rate at which the second sheet including the softening component for washing is dissolved after the first sheet including the detergent component for washing is dissolved, and the dissolution rate difference may be appropriately adjusted by a difference in degree of saponification and/or degree of polymerization of polyvinylalcohol.

The water-soluble polymer may be present in an amount of 5 to 80 weight % on the basis of the total weight of the sheet for washing after dry, preferably 10 to 60 weight %, and more preferably 20 to 50 weight %. When the amount of the water-soluble polymer is smaller than 5 weight %, the tensile strength of the sheet for washing is too weak, making it difficult to form a film. When the amount is larger than 80 weight %, an amount of active components is relatively small, degrading the function of the sheet for washing, or an amount of water-soluble polymer used for a predetermined amount of active components increases, leading to cost increases.

Meanwhile, 'water-soluble' of the film-forming water-soluble polymer in the sheet for washing according to the present disclosure may be defined under the following measurement condition.

A predetermined weight (5 g) of film made of a film forming polymer is introduced into 500 mL of water and vigorously stirred on a magnetic stirrer set to 500 rpm for 10 minutes to prepare a film solution which is filtered using a filter with maximum pore size of 10 μm, the collected filtrate is then dried to take out water, and the weight of the remaining material is measured. In this instance, water-soluble polymer is defined when the weight is 70% or more, preferably 80% or more, and more preferably 90% or more on the basis of the initial film weight.

In the present disclosure, water dispersible polymer is also included in the range of the film-forming water-soluble polymer.

The term 'water dispersivity' as used herein is defined as follows:

A predetermined weight (5 g) of film is introduced into 500 mL of water and vigorously stirred on a magnetic stirrer set to 500 rpm for 10 minutes to prepare a film solution which is filtered using a filter with pore size of 100 μm, the filtered filter is then dried, and a weight change is measured. In this instance, water dispersible film forming polymer is defined when a weight change is 30% or less, preferably 20% or less, and more preferably 10% or less on the basis of the initial film weight.

Furthermore, the water-soluble polymer used in the present disclosure has a film forming property for forming a film matrix, but entangled polymer chains of the water-soluble polymer in the sheet for washing are loosened again by the solvent during washing. That is, the water-soluble polymer is in the form of polymer chains, and when solidified, polymer chains are entangled and agglomerated, and when dissolved in a solvent, the polymer chains are loosened to allow third materials to be inserted between the polymer chains.

The solvent used to manufacture the sheet for washing according to the present disclosure may be water to dissolve the water-soluble polymer. Alcohol which is a hydrophilic solvent may be used, but solubility of the water-soluble polymer reduces, so water is desirable to use.

Furthermore, the two or more sheets included in the laundry product according to the present disclosure may go through a bubbling process to adjust the dissolution rate. That is, if at least one sheet of the sheets is manufactured by a process including bubbling, water solubility is improved and the dissolution rate is faster than an un-bubbled sheet. Preferably, the specific gravity of the sheet for washing can be adjusted to the range between 0.45 and 0.95 through the bubbling process, and a superior effect will be seen from the following example.

Furthermore, the two or more sheets included in the laundry product according to the present disclosure may go through a punching process to adjust the dissolution rate. In the present disclosure, the punching process refers to forming a hole in the sheet for washing, and the hole is not limited to a particular shape, but preferably the hole may be in a circular shape of 0.001 to 50 mm in diameter, more preferably 0.01 to 10 mm, and the present disclosure covers holes in any shape if it is included in an equivalent area to the circle. Furthermore, a ratio of the punched area to the entire area of the sheet is preferably less than 50% on the basis of the total area of the sheet, and more preferably less than 30%. As seen from the example of the present disclosure, it was experimentally verified that the dissolution rate becomes faster than an un-punched sheet through the punching process, and its resulting good effect was also experimentally verified.

That is, the laundry product including the two or more sheets for washing of the present disclosure may be manufactured by any method if each sheet for washing has different dissolution rates.

Further, any manufacturing method may be used if the laundry product of the present disclosure is provided such that each sheet for washing has different dissolution rates, the detergent component for washing and the softening component for washing are released from each sheet for washing at a time interval.

For example, in case that the second sheet (the sheet for washing including the softening component for washing) made of the same water-soluble polymer as the water-soluble polymer used in the first sheet (the sheet for washing including the detergent component for washing) is manufactured, when the first sheet is manufactured by a process including bubbling and/or punching, the problem intended to solve by the present disclosure can be solved. The same water-soluble polymer may be understood as water-soluble polymer with the same degree of saponification and degree of polymerization.

The 'detergent component for washing' in the present disclosure may be an anionic surfactant, a non-ionic surfactant or an amphoteric surfactant commonly used in a wide range of applications, and may be mixtures thereof.

The anionic surfactant typically includes a carboxylate compound such as a soap, higher alcohol, higher alkyl ester, a sulfuric ester salt compound produced by sulfation of olefin, alkyl benzene sulfonate, a sulfate compound including a lauryl sulfate salt, and a phosphate compound produced by phosphorylation of higher alcohol.

For example, the anionic surfactant includes, but is not limited to, lauryl benzene sulfonic acid, α-olefin sulfonate, sodium lauryl sulfate, sodium lauryl ethoxylated sulfate, secondary alkanesulfonate and methyl ester sulfonate, used singly or in combination. Preferably, among these anionic surfactants, sodium lauryl sulfate may be used.

Furthermore, the non-ionic surfactant includes, but is not limited to, polyoxy alkylene alkyl phenyl ether, polyoxy alkylene alkyl ether, polyoxy ethylene polyoxy propylene block polymer, polyethylene glycol fatty acid ester, polyoxy ethylene sorbitan fatty acid ester, cocamido monomethylamine, cocamido dimethylamine, cocamido monoethylamine, fatty acid alkanolamine, amine oxide, alkyl polyglucoside, methyl polyethylene alkyl ether and sugar ether, used singly or in combination. Particularly, it is preferable to use polyoxy alkylene alkyl ether represented by the following chemical formula 1 or polyoxy alkylene alkyl phenylether represented by the following chemical formula 2:

[Chemical formula 1]

[Chemical formula 2]

In chemical formulas 1 and 2, m is an integer of 5 to 21, and n is an integer of 1 to 20.

Furthermore, the amphoteric surfactant includes, but is not limited to, amine-oxide, and cocamidopropyl betaine, used singly or in combination.

Furthermore, the 'softening component for washing' in the present disclosure includes fabric softener commonly used in a wide range of application.

More specifically, the laundry product according to the present disclosure may use a cationic surfactant of a quaternary ammonium chloride group as the fabric softener. For example, the fabric softener includes dialkyl dimethyl ammonium chloride represented by the following chemical formula 3, dialkyl imidazolinium salt represented by the following chemical formula 4, dialkylamido quaternary ammonium salt represented by the following chemical formula 5, and ester quat type, and at least one selected from them may be used.

[Chemical formula 3]

[Chemical formula 4]

[Chemical formula 5]

In chemical formulas 3, 4 and 5, each R is independently selected from the group consisting of straight or branched, saturated or unsaturated alkyl hydrocarbon having 1 to 30 carbon atoms.

Furthermore, the fabric softener component includes natural or synthetic cationic polymer. For example, the cationic polymer includes, but is not limited to, cationic guar such as hydroxypropyltrimonium chloride guar and hydroxypropyl guar hydroxypropyltrimonium chloride, cellulose (polyquaternium-10), polyquaternium series, dimethyl diallyl ammonium chloride polymer, acrylamide-dimethyldiallylammonium copolymer, polyvinylpyrrolidone (PVP)-dimethylaminoethylmethacrylate copolymer, acrylic acid-dimethyldiallylammonium chloride copolymer, acryl-amide-dimethylamino ethylmethacrylatemethylchloride copolymer, trimethylaminoethylmethacrylate polymer, used singly or in combination.

Furthermore, the laundry product according to the present disclosure may further include dispersant, perfume, preservative, dye or an antimicrobial agent, in the two or more sheets or separately from the two or more sheets. The perfume may include a fragrance booster.

Preferably, the dispersant may be included in the sheet including the detergent component for washing, and the perfume may be included in the sheet including the softening component for washing.

The laundry product according to a preferred embodiment of the present disclosure may be manufactured by the steps including:

(S1) dissolving water-soluble polymer having different dissolution rates to prepare each solution for manufacturing two or more sheets for washing;

(S2) adding same or different components for washing to each solution for manufacturing two or more sheets for washing prepared at the step (S1), and mixing them;

(S3) forming sheets for washing using each solution prepared at the step (S2); and (S4) assembling each sheet for washing.

At the step (S1), agglomerated polymer chains in the water-soluble polymer are loosened, at the step (S2), a component for washing, for example, i) a detergent component for washing, ii) a softening component for washing, iii) perfume, or iv) two or more of these is distributed between the loosened polymer chains, and before or after (S4), a drying step is included, and in this instance, when the water-soluble polymer is re-agglomerated and solidified, the component for washing is mechanically positioned between polymer chains in the sheet.

Preferably, the component for washing added at the step (S2) may be a detergent component for washing or a softening component for washing, and the detergent component for washing is added to a solution including water-soluble polymer having the highest dissolution rate (a solution for forming a first sheet) among the solutions for manufacturing each sheet for washing prepared at the step (S1). Furthermore, the softening component for washing may be added to a solution for manufacturing a sheet for washing (a solution for forming a second sheet) that is different from the solution including water-soluble polymer having the highest dissolution rate among the solutions for manufacturing sheets for washing.

Accordingly, the sheet for washing including the added softening component for washing has a different dissolution rate from the sheet for washing including the added detergent component for washing, and preferably has a slower dissolution rate than the sheet for washing including the added detergent component for washing. The laundry product manufactured in this way prevents the formation of a complex of the detergent component for washing and the softening component for washing during washing of laundry. The dissolution rate is the same as described in the laundry product.

Furthermore, the assembling at the step (S4) may comprise stacking the sheets for washing; or forming a layer of sheets for washing such that each sheet for washing has different regions on the layer of sheets for washing.

The reaction conditions of the drying step vary depending on the process conditions, but the temperature of the drying furnace may be 40 to 120° C., the drying time may be 5 to 30 minutes, and the drying rate may be 1 to 10 m/min.

The tensile strength of the sheet for washing according to the present disclosure is preferably 0.5 to 15 kgf/cm², and more preferably 1 to 12 kgf/cm². When the sheet for washing is lower than 0.5 kgf/cm², the sheet for washing is easily torn during transportation and use, making it difficult to handle during transportation and use, and when the sheet for washing is higher than 15 kgf/cm², there is a risk of water solubility reduction.

The sheet for washing according to the present disclosure preferably has a thickness of 1 μm to 1 cm, and more preferably, 5 μm to 0.5 cm. When the thickness of the dried sheet for washing is less than 1 μm, it is insufficient for the support of the active components, the strength of the sheet is low, and desired performance is difficult to obtain. When the thickness of the dried sheet for washing is greater than 1 cm, the solubility of the sheet is not good, and it is difficult to obtain a water-soluble film of uniform property.

The sheet for washing according to the present disclosure is completely dissolved in water after use, eliminating the need for a removal process of the sheet for washing. That is, the water-soluble polymer that forms a matrix of sheets is dissolved in water and removed, and the component for washing exerts an effect when dissolved or dispersed in wash water.

The laundry product of the present disclosure may be produced by forming the sheet including the detergent component for washing and the sheet including the softening component for washing as a package.

Laundry product users can use each sheet for washing having different solubility included in the laundry product by putting them in washing machines at one time.

Advantageous Effects

The present disclosure provides a sheet for washing that is completely dissolved in water and eliminates the need to remove after washing.

The sheet for washing of the present disclosure has excellent cleaning performance and is easy to use.

Furthermore, storage stability of the sheet for washing is high.

Because it is easy to use, it is convenient to use during washing.

The laundry product of the present disclosure simultaneously provides cleaning performance and softening performance more efficiently by separately supporting a cleaning component and a softening component.

BRIEF DESCRIPTION OF DRAWINGS

The following drawings attached hereto are provided to illustrate the preferred embodiments of the present disclosure, and together with the foregoing description, serve to help the understanding of the technical features of the present disclosure, and thus the present disclosure should not be construed as being limited to the disclosure of the drawings.

FIG. 1 is a diagram showing the laundry product 1 provided such that a first sheet 10 including a detergent component for washing and a second sheet 20 including a softening component for washing are stacked.

FIG. 2 is a diagram showing the laundry product 2 in which a layer having a connection of a first sheet 10 including a detergent component for washing and a second sheet 20 including a softening component for washing are connected to form a layer, each occupying its own region. L denotes a connected part of the sheets.

FIG. 3 shows the laundry product 3 having a stack of two layers. One layer of the laundry product 3 is a sheet for washing 10 in which a detergent component for washing, the other is a horizontal connection of a sheet for washing 20 including a softening component for washing and a sheet for washing 30 including perfume and/or a fragrance booster, and they are horizontally connected to each other, each occupying its own region. L denotes a connected part of the sheets.

MODE FOR DISCLOSURE

Figure 1:
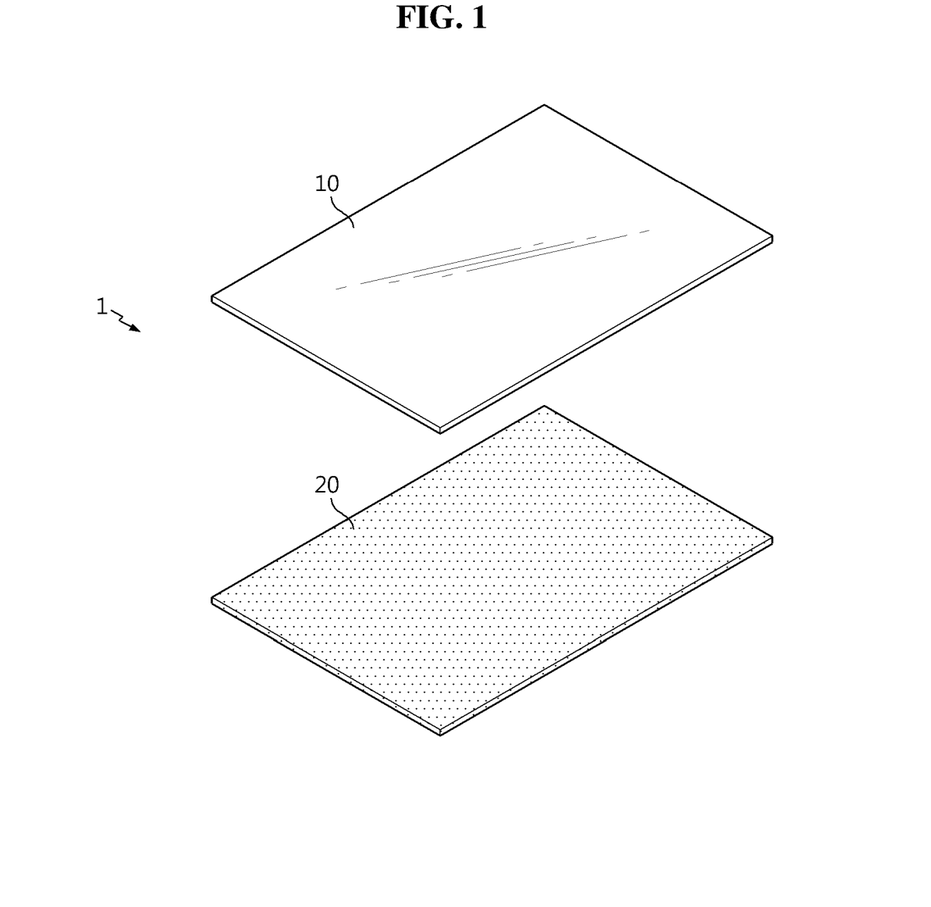
FIG. 1 shows an embodiment of a laundry product of the present disclosure.
Figure 2:
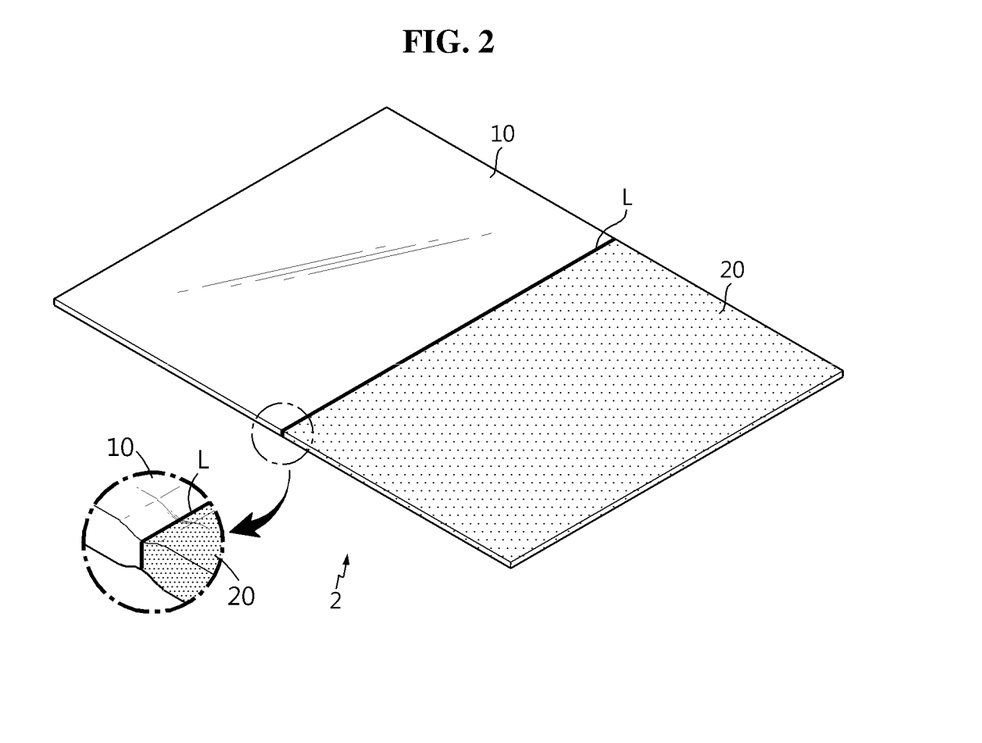
FIG. 2 shows another embodiment of a laundry product of the present disclosure.
Figure 3:
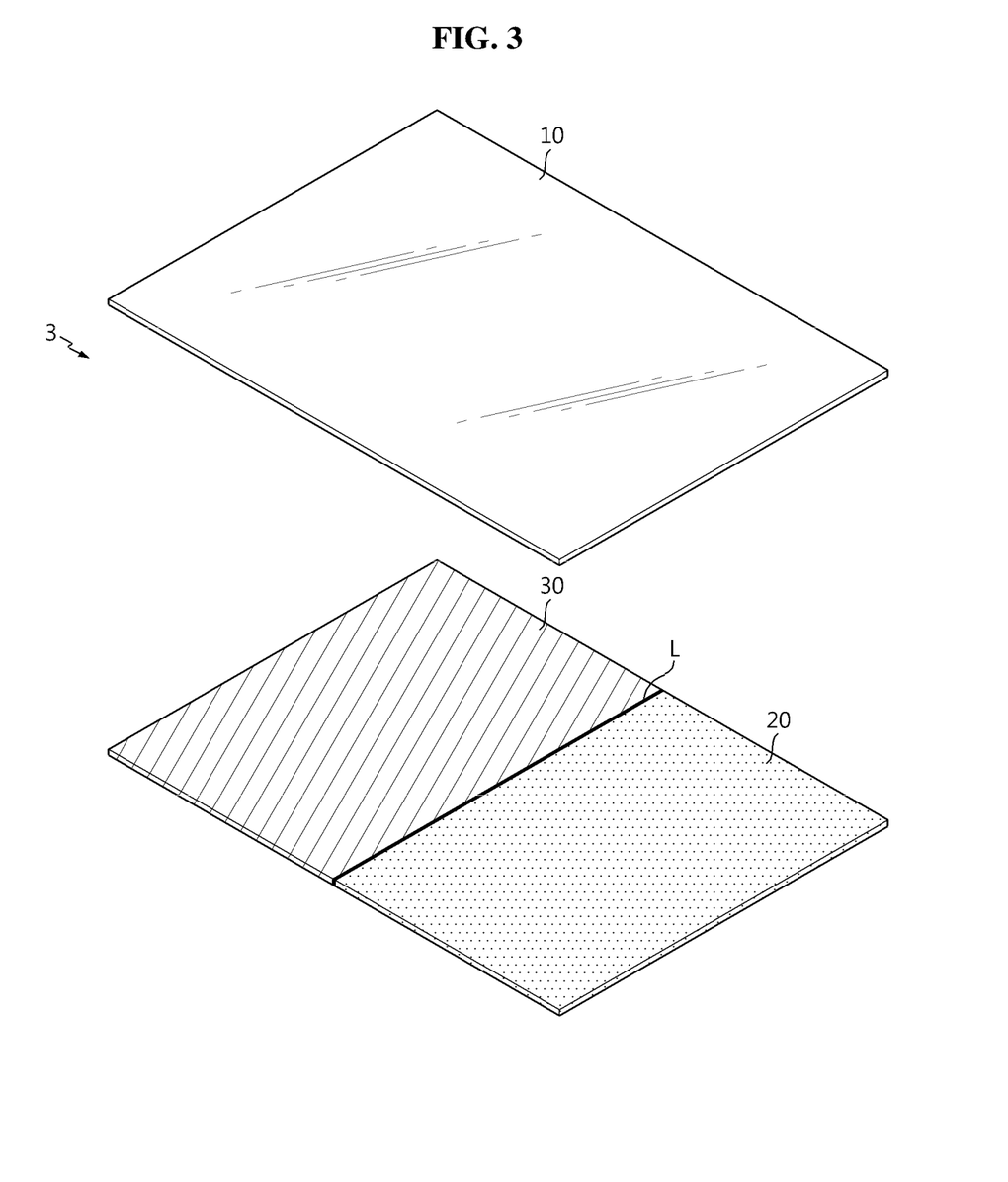
FIG. 3 shows still another embodiment of a laundry product of the present disclosure.

Hereinafter, the embodiments of the present disclosure will be described in detail to help a further understanding of the present disclosure. However, the embodiments of the present disclosure may be modified in many different forms, and it should not be understood that the scope of the disclosure is limited to the following embodiments. The embodiments of the present disclosure are provided to persons having ordinary skill in the art for complete and full description of the present disclosure.

Comparative Example 1

200 g of PVA (degree of saponification: 72%, average polymerization degree: 500) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.02 cm) containing final active components.

Comparative Example 2

200 g of PVA (degree of saponification: 82%, average polymerization degree: 500) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.02 cm) containing final active components.

Comparative Example 3

200 g of PVA (degree of saponification: 72%, average polymerization degree: 700) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.02 cm) containing final active components.

Comparative Example 4

200 g of PVA (degree of saponification: 88%, average polymerization degree: 1,000) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.02 cm) containing final active components.

Example 1

Sheet 1: 200 g of PVA (degree of saponification: 72%, average polymerization degree: 500) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of PVA (degree of saponification: 72%, average polymerization degree: 700) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (laundry product, thickness: 0.02 cm).

Example 2

Sheet 1: 200 g of PVA (degree of saponification: 72%, average polymerization degree: 500) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of PVA (degree of saponification: 88%, average polymerization degree: 1,000) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (laundry product, thickness: 0.02 cm).

Example 3

Sheet 1: 200 g of PVA (degree of saponification: 82%, average polymerization degree: 500) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of PVA (degree of saponification: 72%, average polymerization degree: 700) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (laundry product, thickness: 0.02 cm).

Example 4

Sheet 1: 200 g of PVA (degree of saponification: 82%, average polymerization degree: 500) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of PVA (degree of saponification: 88%, average polymerization degree: 1,000) was put into 800 g of distilled water and dissolved therein at 80° C. for 4 hours to prepare 20 weight % PVA solution. Active components were added to the prepared PVA solution according to the composition shown in the following table 1 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (laundry product, thickness: 0.02 cm).

TABLE 1

|  |  |  | Example | | | | Comparative example | | | |
| --- | --- | --- | --- | --- | --- | --- | --- | --- | --- | --- |
| Item (Unit: weight %) | | | 1 | 2 | 3 | 4 | 1 | 2 | 3 | 4 |
| Sheet 1 | Polymer matrix | PVA01[(1)] | 20 | 20 | — | — | 40 | — | — | — |
|  |  | PVA02[(2)] | — | — | 20 | 20 | — | 40 | — | — |
|  | Active component | Cleaning component[(5)] | 29 | 29 | 29 | 29 | 29 | 29 | — | — |
|  |  | Softening component[(6)] | — | — | — | — | 29 | 29 | — | — |
|  |  | Perfume | — | — | — | — | 2 | 2 | — | — |
| Sheet 2 | Polymer matrix | PVA03[(3)] | 20 | — | 20 | — | — | — | 40 | — |
|  |  | PVA04[(4)] | — | 20 | — | 20 | — | — | — | 40 |
|  | Active component | Cleaning component[(5)] | — | — | — | — | — | — | 29 | 29 |
|  |  | Softening component[(6)] | 29 | 29 | 29 | 29 | — | — | 29 | 29 |
|  |  | Perfume | 2 | 2 | 2 | 2 | — | — | 2 | 2 |
| Total | | | 100 | 100 | 100 | 100 | 100 | 100 | 100 | 100 |

(Note)
PVA[(1)]: polyvinylalcohol, degree of saponification: 72%, average polymerization degree: 500
PVA[(2)]: polyvinylalcohol, degree of saponification: 82%, average polymerization degree: 500
PVA[(3)]: polyvinylalcohol, degree of saponification: 72%, average polymerization degree: 700
PVA[(4)]: polyvinylalcohol, degree of saponification: 88%, average polymerization degree: 1,000
Cleaning component[(5)]: sodium lauryl sulfate (SLS)
Softening component[(6)]: dialkylamido quaternary ammonium salt <Experimental Example 1> Sheet Solubility and Performance Evaluation Experiment For the sheets for washing manufactured in examples 1 to 4 and comparative examples 1 to 4, sheet solubility and performance was evaluated according to the following method. The performance evaluation items are classified into cleaning ability and fabric softening on the basis of the soiled fabric manufactured by laundry science association in Japan.

(Evaluation of Sheet Solubility)

The solubility of the sheets for washing manufactured in examples 1 to 4 and comparative examples 1 to 4 was measured as follows:

Each laundry product was cut to the size of 16 cm×25 cm, folded four times and put into 15 cm×15 cm black cloth (wool 50%, polyester 50%) which was tied with a cable tie. 1 L of purified water was put into 2 L beaker, and the prepared black cloth was soaked for 5 minutes and stirred under the condition in which swirl is produced up to 700 ml when stirring is performed for 10 minutes. After stirring, drying was performed at 100° C. for 2 hours, the weight of the laundry product was measured before and after the sample, the reduced weight was indicated in percent, and solubility properties were evaluated. The results are shown in the following table 2.

TABLE 2

|  | Example | | | | Comparative example | | | |
| --- | --- | --- | --- | --- | --- | --- | --- | --- |
| Evaluation results | 1 | 2 | 3 | 4 | 1 | 2 | 3 | 4 |
| Sheet solubility | 73 | 63 | 81 | 69 | 88 | 95 | 65 | 52 |

(Evaluation of Cleaning Ability)

The cleaning ability was evaluated using a washing machine of the same condition, and in this instance, tap water was used for rinsing. The temperature for washing was that of cold water of the same condition used in homes, and a wet artificially soiled fabric manufactured by laundry science association in Japan was used as a soiled fabric for evaluation of cleaning ability. Evaluation was conducted while the soiled fabric was attached to a real cotton T-shirt. Comparative evaluation was conducted by a statistical method using 16 pieces of soiled fabrics having a size of 5 cm×5 cm. In this instance, a WB value representing a whiteness index of the soiled fabric was measured using a color difference meter before and after washing. The sheet for washing manufactured in the above examples was tailored into a size of 20 cm×15 cm, and 2 pieces of the tailored detergents were used.

At the beginning of washing laundry, the sheet for washing was put into a washing machine together with the soiled fabrics, washing was done under the conditions of a standard program (washing for 20 minutes, rinsing twice) of the washing machine and a middle water level, and after dehydration, the soiled fabrics were dried in a steady temperature and humidity room (25° C., 20% RH) for a day and ironed, and a WB value was measured using the same color difference meter. The obtained result was substituted to the Kubelka-Munk equation represented by the following equation 1 to calculate a cleaning ability, and the results are shown in Table 3.

$$\text{CLEANING ABILITY}(\%) = \frac{[(1-R_s^2)/2R_s - (1-R_c^2)/2R_c]}{[(1-R_s^2)/2R_s - (1-R_o^2)/2R_o]} \times 100 \quad \text{[Equation 1]}$$

In Equation 1, $R_s$ denotes a surface reflectivity of a soiled fabric, $R_c$ denotes a surface reflectivity of the soiled fabric after a washing process, and $R_o$ denotes a surface reflectivity of a white cotton fabric.

TABLE 3

|  | Example | | | | Comparative example | | | |
|---|---|---|---|---|---|---|---|---|
| Evaluation results | 1 | 2 | 3 | 4 | 1 | 2 | 3 | 4 |
| Cleaning ability (%) (Soiled fabric manufactured by Laundry science association in Japan) | 68 | 73 | 70 | 75 | 35 | 37 | 32 | 30 |

As shown in Table 3, in the case of supporting the active components differently depending on the dissolution rate, the cleaning performance of examples 1~4 was outstanding.

(Evaluation of Fabric Softening)

The softening performance after washing was evaluated in accordance with the test method in EL306, and 3 towels were used as laundry clothes. The sheets for washing manufactured in comparative examples and examples were tailored to the size of 20 cm×15 cm, and two tailored sheets were used. At the beginning of washing laundry, the sheets for washing were introduced together with the towels, and dried in a steady temperature and humidity room for 12 hours after washing. Softening performance evaluation was conducted by ten monitoring specialists through sensory testing.

Reference for determination is no additive, being equal to the reference is evaluated to a score of 0, better than the reference is a score of 1, being much better than the reference is evaluated to a score of 2, being slightly worse than the reference is evaluated to a score of −1, and being worse than the reference is evaluated to a score of −2, and its results are shown in the following table 4.

TABLE 4

|  | Example | | | | Comparative example | | | |
|---|---|---|---|---|---|---|---|---|
| Evaluation results | 1 | 2 | 3 | 4 | 1 | 2 | 3 | 4 |
| Softening performance | 1.5 | 2 | 2 | 2 | 0 | 0 | 0 | 0 |

As shown in Table 4, in the case of supporting the active components differently depending on the dissolution rate, the softening performance of examples 1~4 was outstanding.

<Experimental Example 2> Evaluation of Sheet Performance after Mechanical Treatment Comparative Example 5

Sheet 1: 200 g of PVA (degree of saponification: 72%, average polymerization degree: 500) was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of the same PVA (degree of saponification: 72%, average polymerization degree: 500) as the sheet 1 was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (laundry product, thickness: 0.02 cm).

Comparative Example 6

Sheet 1: 200 g of PVA (degree of saponification: 82%, average polymerization degree: 500) was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of the same PVA (degree of saponification: 82%, average polymerization degree: 500) as the sheet 1 was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (thickness: 0.02 cm).

Comparative Example 7

Sheet 1: 200 g of PVA (degree of saponification: 72%, average polymerization degree: 700) was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of the same PVA (degree of saponification: 72%, average polymerization degree: 700) as the sheet 1 was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (thickness: 0.02 cm).

Comparative Example 8

Sheet 1: 200 g of PVA (degree of saponification: 88%, average polymerization degree: 1,000) was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

Sheet 2: 200 g of the same PVA (degree of saponification: 88%, average polymerization degree: 1,000) as the sheet 1 was put into 800 g of distilled water and dissolved therein at 80° C. for 4 hours to prepare 20 weight % PVA solution. Active components were added to the prepared PVA solution according to the composition shown in the following table 5 and mixed using a mechanical stirrer. The mixed solution was put on a release film, produced at a predetermined thickness using an Elcometer film applicator, and dried in 105° C. drying oven for 10 minutes to manufacture a sheet for washing (thickness: 0.01 cm) containing final active components.

The sheet 1 and the sheet 2 manufactured in this way were laminated into a final sheet (thickness: 0.02 cm).

The following table 5 shows examples 5 to 12 and comparative examples 5 to 8 to which mechanical treatment was applied. In examples, bubbling or punching was performed on the sheet 1 including a cleaning component requiring faster dissolution. The bubbling was performed, using the composition of comparative examples, by stirring a mixed solution of PVA solution and active components while injecting air to form microbubbles in the solution. The punching was performed on the sheet 1 manufactured with the composition of comparative examples using a punching machine.

TABLE 5

| | | Example | | | | | | | | Comparative example | | | |
|---|---|---|---|---|---|---|---|---|---|---|---|---|---|
| Item (Unit: weight %) | | 5 | 6 | 7 | 8 | 9 | 10 | 11 | 12 | 5 | 6 | 7 | 8 |
| Sheet 1 | PVA01[1] | 20 | — | — | — | 20 | — | — | — | 20 | — | — | — |
| | PVA02[2] | — | 20 | — | — | — | 20 | — | — | — | 20 | — | — |
| | PVA03[3] | — | — | 20 | — | — | — | 20 | — | — | — | 20 | — |
| | PVA04[4] | — | — | — | 20 | — | — | — | 20 | — | — | — | 20 |
| | Cleaning component[5] | 29 | 29 | 29 | 29 | 29 | 29 | 29 | 29 | 29 | 29 | 29 | 29 |
| | Mechanical treatment | Bubbling, specific gravity 0.6 | | | | Punching, 5 mm/10 mm | | | | — | | | |
| Sheet 2 | PVA01 | 20 | — | — | — | 20 | — | — | — | 20 | — | — | — |
| | PVA02 | — | 20 | — | — | — | 20 | — | — | — | 20 | — | — |
| | PVA03 | — | — | 20 | — | — | — | 20 | — | — | — | 20 | — |
| | PVA04 | — | — | — | 20 | — | — | — | 20 | — | — | — | 20 |
| | Softening component[6] | 29 | 29 | 29 | 29 | 29 | 29 | 29 | 29 | 29 | 29 | 29 | 29 |
| | Perfume | 2 | 2 | 2 | 2 | 2 | 2 | 2 | 2 | 2 | 2 | 2 | 2 |
| | Total | 100 | 100 | 100 | 100 | 100 | 100 | 100 | 100 | 100 | 100 | 100 | 100 |

(Note)
PVA[1]: polyvinylalcohol, degree of saponification: 72%, average polymerization degree: 500
PVA[2]: polyvinylalcohol, degree of saponification: 82%, average polymerization degree: 500
PVA[3]: polyvinylalcohol, degree of saponification: 72%, average polymerization degree: 700
PVA[4]: polyvinylalcohol, degree of saponification: 88%, average polymerization degree: 1,000
Cleaning component[5]: sodium lauryl sulfate (SLS)
Softening component[6]: dialkylamido quaternary ammonium salt The cleaning ability evaluation results of the sheets manufactured according to comparative examples 5 to 8 and examples 5 to 12 are shown in the following table 6.

TABLE 6

| | Comparative example | | | | Example | | | | | | | |
|---|---|---|---|---|---|---|---|---|---|---|---|---|
| Evaluation results | 5 | 6 | 7 | 8 | 5 | 6 | 7 | 8 | 9 | 10 | 11 | 12 |
| Cleaning ability (%) (Soiled fabric manufactured by Laundry science association in Japan) | 58 | 63 | 55 | 60 | 69 | 72 | 64 | 69 | 66 | 70 | 62 | 67 |

As shown in Table 6, when mechanical treatment was performed, cleaning performance was found better.

For the sheets manufactured according to comparative examples 5 to 8 and examples 5 to 12, softening performance evaluation results are shown in the following table 7.

TABLE 7

| Evaluation results | Comparative example | | | | Example | | | | | | | |
|---|---|---|---|---|---|---|---|---|---|---|---|---|
| | 5 | 6 | 7 | 8 | 5 | 6 | 7 | 8 | 9 | 10 | 11 | 12 |
| Softening performance | 1.5 | 1.0 | 1.5 | 1.0 | 2.0 | 2.0 | 2.0 | 2.0 | 2.0 | 2.0 | 2.0 | 2.0 |

As shown in Table 7, when mechanical treatment was performed, the softening performance was better.

INDUSTRIAL APPLICABILITY

The present disclosure provides a sheet for washing that is completely dissolved in water and eliminates the need to remove after washing. The present disclosure provides a sheet for washing that has outstanding cleaning performance, is easy to use, and provides high storage stability. The objects of each of a softening component and a detergent component can be effectively achieved.

What is claimed is:

1. A laundry product comprising:
   a first sheet and a second sheet having different dissolution rates, wherein the first sheet comprises a detergent component for washing and a first water-soluble polymer; and the second sheet comprises a softening component for washing and a second water-soluble polymer,
   wherein the first sheet and the second sheet optionally comprise a perfume, and
   wherein the second water soluble polymer dissolves in water more slowly than the first water-soluble polymer.

2. The laundry product according to claim 1, wherein the first sheet and the second sheet are assembled or separate from each other.

3. The laundry product according to claim 2, wherein the first sheet and the second sheet are assembled such that the first sheet and the second sheet are stacked; or the first sheet and the second sheet are connected to form a layer having different regions on a plane.

4. The laundry product according to claim 1, wherein the first water-soluble polymer and the second water-soluble polymer are poly vinyl alcohol.

5. A method for manufacturing a laundry product comprising two or more sheets for washing having different dissolution rates, comprising:

dissolving a first water-soluble polymer in a first solvent to prepare a first solution for a first sheet for washing;
adding a first component for washing to the first solution for manufacturing the first sheet for washing, and mixing to prepare a first mixed solution;
drying the first mixed solution for manufacturing the first sheet for washing with the first component for washing;
dissolving a second water-soluble polymer in a second solvent to prepare a second solution for a second sheet for washing;
adding a second component for washing to the second solution for manufacturing the second sheet for washing, and mixing to prepare a second mixed solution;
drying the second mixed solution for manufacturing the second sheet for washing with the second component for washing,
wherein the first component is a detergent component for washing and the second component is a softening component for washing.

6. The method according to claim 5, wherein the first water-soluble polymer dissolved in the first solution for manufacturing the first sheet for washing and the second water-soluble polymer dissolved in the second solution for manufacturing the second sheet for washing are water-soluble polymers having different degrees of saponification or average polymerization degrees, and the dissolution rate of the first sheet for washing is faster than that of the second sheet for washing.

7. The method according to claim 5, wherein the method further comprises a mechanical step of
   i) bubbling or
   ii) punching the first sheet for washing.

8. The method according to claim 7, wherein the method further comprises assembling the first sheet for washing and the second sheet for washing.

9. The method according to claim 8, wherein the first sheet for washing and the second sheet for washing are stacked; or the first sheet and the second sheet are connected in a single-layer sheet for washing, wherein the first sheet and the second sheet have different regions in the single-layer sheet for washing.

10. The laundry product of claim 1, wherein a dissolution rate difference between the first sheet and the second sheet is from 30 seconds to 20 minutes.

11. The method of claim 5, wherein a dissolution rate difference between the first sheet and the second sheet is from 30 seconds to 20 minutes.

* * * * *